United States Patent
Filali-Adib et al.

(10) Patent No.: US 9,430,223 B2
(45) Date of Patent: *Aug. 30, 2016

(54) LIVE OPERATING SYSTEM UPDATE MECHANISMS

(71) Applicant: International Business Machines Corporation, Armonk, NY (US)

(72) Inventors: Khalid Filali-Adib, Austin, TX (US); Christophe Lombard, Saint Paul de Vence (FR); John M. McConaughy, Austin, TX (US); David W. Sheffield, Austin, TX (US); Sungjin Yook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/496,292

(22) Filed: Sep. 25, 2014

(65) Prior Publication Data

US 2016/0092202 A1 Mar. 31, 2016

(51) Int. Cl.
G06F 9/44 (2006.01)
G06F 9/445 (2006.01)
G06F 9/48 (2006.01)
G06F 9/50 (2006.01)

(52) U.S. Cl.
CPC .............. *G06F 8/67* (2013.01); *G06F 9/445* (2013.01); *G06F 9/4856* (2013.01); *G06F 9/5077* (2013.01)

(58) Field of Classification Search
None
See application file for complete search history.

(56) References Cited

U.S. PATENT DOCUMENTS

| | | |
|---|---|---|
| 5,142,680 A | 8/1992 | Ottman et al. |
| 6,941,430 B2 | 9/2005 | Jones et al. |
| 7,000,229 B2 | 2/2006 | Gere |
| 7,010,584 B1 | 3/2006 | Craft |
| 8,146,073 B2 | 3/2012 | Sinha |
| 8,387,045 B2 | 2/2013 | Yasutaka et al. |
| 8,392,902 B2 | 3/2013 | Reinz |
| 8,458,392 B2 | 6/2013 | Gao et al. |
| 8,495,012 B2 | 7/2013 | Nagai et al. |
| 8,650,579 B1 | 2/2014 | Herington et al. |

(Continued)

OTHER PUBLICATIONS

List of IBM Patents or Patent Applications Treated as Related (Appendix P), 2 pages.

(Continued)

*Primary Examiner* — Li B Zhen
*Assistant Examiner* — Mohammad Kabir
(74) *Attorney, Agent, or Firm* — Stephen J. Walder, Jr.; Joseph Petrokaitis

(57) ABSTRACT

Mechanisms are provided for performing a live update of an operating system. The mechanisms receive an update to an operating system and clone a root volume group associated with an operating system instance executing in a first logical partition of the data processing system to generate a cloned root volume group. The mechanisms apply the update to the cloned root volume group to generate an updated and cloned root volume group and boot a second logical partition of the data processing system using the updated and cloned root volume group. Moreover, the mechanisms mirror the original root volume group associated with an operating system instance executing in a first logical partition and import the mirrored root volume group into the second logical partition. The mechanisms migrate application instances to the second logical partition by restarting the application instances in the second logical partition using the mirrored root volume group.

10 Claims, 11 Drawing Sheets

(56) References Cited

U.S. PATENT DOCUMENTS

| | | | |
|---|---|---|---|
| 2003/0126388 A1* | 7/2003 | Yamagami | G06F 11/2058 711/162 |
| 2004/0199910 A1* | 10/2004 | Baack | G06F 8/65 717/171 |
| 2005/0091354 A1 | 4/2005 | Lowell et al. | |
| 2006/0174238 A1 | 8/2006 | Henseler et al. | |
| 2006/0271754 A1 | 11/2006 | Shibayama et al. | |
| 2007/0180206 A1 | 8/2007 | Craft et al. | |
| 2008/0104588 A1 | 5/2008 | Barber et al. | |
| 2008/0126792 A1 | 5/2008 | Herington et al. | |
| 2009/0307456 A1 | 12/2009 | Patwari et al. | |
| 2010/0094948 A1 | 4/2010 | Ganesh et al. | |
| 2014/0059302 A1* | 2/2014 | Hayakawa | G06F 3/0644 711/153 |
| 2014/0244950 A1* | 8/2014 | Baron | G06F 3/065 711/162 |

OTHER PUBLICATIONS

Baumann, Andrew et al., "Providing Dynamic Update in an Operating System", USENIX Association, 2005 USENIX Annual Technical Conference, General Track, Mar. 2005, pp. 279-291.

Milberg, Ken, "Workload Partitioning (WPAR) in AIX 6.1", IBM Corporation, http://www.ibm.com/developerworks/aix/library/au-wpar61aix, Apr. 8, 2008, 12 pages.

Streicher, Martin, "Speaking UNIX: Get to know Ksplice", IBM, http://www.ibm.com/developerworks/aix/library/au-spunix_ksplice/, Jul. 27, 2010, 9 pages.

"List of IBM Patents or Patent Applications Treated as Related", Jun. 3, 2015, 2 pages.

* cited by examiner

LIVE OPERATING SYSTEM UPDATE MECHANISMS

BACKGROUND

The present application relates generally to an improved data processing apparatus and method and more specifically to mechanisms for performing live operating system updates.

Updating or patching the kernel of an operation system generally requires rebooting the computing system. That is, the update or patch of the kernel is installed and then the computing system must be rebooted for the update or patch of the kernel to be loaded and executed on the computing system. This means that kernel fixes or updates cannot be applied to a system without restarting applications after experiencing some downtime to accomplish the rebooting operation.

SUMMARY

In one illustrative embodiment, a method, in a data processing system comprising a processor and a memory, for performing a live update of an operating system. The method comprises receiving an update to an operating system and cloning an original root volume group associated with an operating system instance executing in a first logical partition of the data processing system to generate a cloned root volume group for booting a second logical partition of the data processing system. The method further comprises mirroring the original root volume group associated with an operating system instance executing in a first logical partition of the data processing system to generate a mirrored root volume group in the first logical partition. Modifications to the original root volume group are mirrored to the mirrored root volume group. The method also comprises applying the update to the cloned root volume group to generate an updated and cloned root volume group and booting the second logical partition of the data processing system using the updated and cloned root volume group. Moreover, the method comprises importing the mirrored root volume group into the second logical partition and migrating application instances to the second logical partition by restarting the application instances in the second logical partition using the mirrored root volume group.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
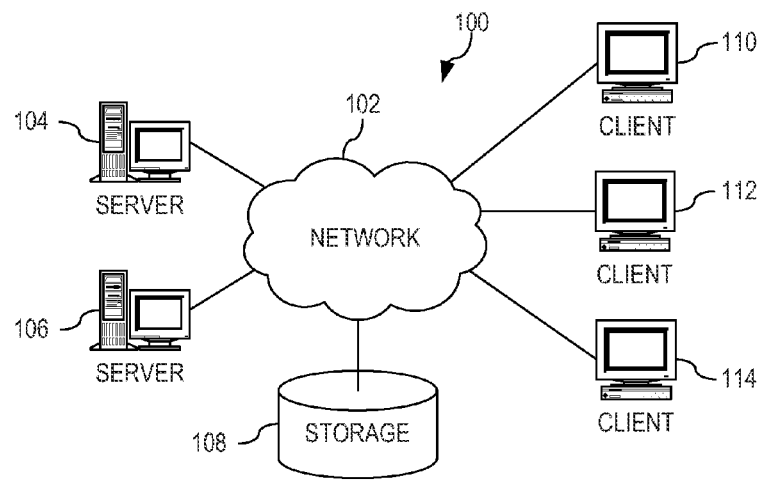
FIG. 1 is an example diagram of a distributed data processing system in which aspects of the illustrative embodiments may be implemented.

As mentioned above, in order to perform an update or patch of an operating system or kernel, the computing system executing the operating system or kernel needs to be rebooted which causes user applications to be restarted after a period of delay corresponding to the amount of time required to reboot the computing system. This can be inconvenient and frustrating to users of such computing systems since the user's workloads may need to be restarted once the computing system is rebooted.

Moreover, while some "hot patch" capabilities have been made possible in the past, these "hot patch" capabilities are greatly limited to only certain types of kernel and kernel extension fixes. Moreover, the changes included in the patch must be only to program text and/or local stack variables. This means that, with "hot patch" capabilities, there cannot be any additions, deletions, rearrangement, or other modifications of data definitions, such as string definitions or the like. Moreover, this means that there cannot be any modifications to a data structure's layout including those resulting from type changes. Furthermore, this means that there cannot be any new long constants generated for which the compiler creates static entries. There are many more detailed and difficult limitations to such "hot patch" capabilities with the above being merely illustrative of the severe limitations of the current "hot patch" capabilities for operating systems.

One solution to these problems, offered in the Advanced Interactive Executive (AIX) 6.1 operating system, available from International Business Machines Corporation of Armonk, N.Y., is to make use of workload partitions (WPARs) on logical partitions (LPARs). A LPAR is a subset of the computing system's hardware and software resources virtualized as a separate instance of the hardware/software such that the applications running on the LPAR have the view that they have access to all of the hardware/software of the computing system. A computing system may have multiple LPARs running, each with a separate operating system or kernel instance associated with the LPAR.

WPARs are mechanisms that permit the virtualization of an operating system or kernel within a LPAR. WPARs allow one to virtualize application workloads through operating system virtualization. Thus, WPARs are virtualized operating system environments that are created within a single AIX image, e.g., WPARs may be created within LPARs. There are essentially two types of WPARs: system WPARs, which are similar to a complete version of an operating system having its own dedicated filesystems and operating system daemon processes, and application WPARs, which are a more lightweight version of virtualized operating system environments having limited capabilities and which can only run application processes, not operating system daemons.

With regard to the potential solution to operating system or kernel updates/patches using WPARs, one may take all of the applications running on an LPAR and put them inside a WPAR on that LPAR. Then, when a kernel or operating system update is required, the LPAR may be cloned to a new LPAR. The new LPAR may then be patched with the update. The WPAR may then be moved to the new LPAR. However, this approach has a number of limitations.

First, there are a number of items that cannot be placed inside a WPAR including PowerHA (High Availability) application resources, Reliable Scalable Cluster Technology (RSCT) application resources, Network File system (NFS) server resources, Kerberos-protected NFS mounts, Workload Manager (WLM) controls, etc. Moreover, for the WPAR mobility to take place, i.e. the movement of the WPAR to the new LPAR, the WPAR must have its own rootvg, i.e. its own volume group (vg) (also referred to as logical disks) that contains a root volume containing the operating system instance, and any other logical volumes or resources that are created during installation. Moreover, the LPARs must have an IBM Director with WPAR manager installed. In addition, there is a performance penalty for running a WPAR, especially in one that is checkpointable (i.e. one that can be moved). This is because the kernel tracks the activities of every process and thread inside a mobile WPAR so that when a move is done, the kernel knows what processes and what associated data needs to be moved.

Thus, the "hot patch" and WPAR based approaches to solving the issue of performing live updates or patches of an operating system or kernel have limitations and drawbacks such that they are either not applicable or not acceptable in many cases.

The illustrative embodiments provide mechanisms for performing live operating system updates/patches that avoid the limitations and drawbacks of the above approaches. With the mechanisms of the illustrative embodiments, the capability is provided to apply any update/patch, collection of updates/patches, and/or enhancements to an operating system or kernel and/or any kernel extension, without having to restart currently running applications or the computing system. In addition, the updates/patches that may be made to the operating system may also include updates to user-space binaries including shared libraries, and the like. The mechanisms of the illustrative embodiments may be implemented on any computing system utilizing virtual devices and storage. The mechanisms of the illustrative embodiments eliminate the limitations of the kernel "hot patch" facility described above and, other than the limitation of having to have virtual devices and storage, the illustrative embodiments place no restrictions on the type of application that can be running on the operating system to be updated.

With the mechanisms of the illustrative embodiments, the live update of the operating system/kernel (hereafter referred to as the "operating system" or OS for simplicity) is accomplished utilizing a second logical partition (LPAR) in addition to the original LPAR whose operating system/kernel is intended to be updated/patched. The second LPAR may be created at update time if no second LPAR is available to use to perform the update. In such a case, the original LPAR's rootvg (root volume group) is cloned and the update is applied to the cloned rootvg. The cloned and updated rootvg is used to boot the second LPAR. Once the second LPAR is booted and is up and running, the applications running on the original LPAR are migrated over to the new (second) LPAR. There may be a brief "blackout" time period during this migration such that the applications will not be responsive as the processes are checkpointed, moved, and restored on the new LPAR. However, this blackout time period is significantly smaller than the period of time required for restarting a computing system and restarting applications and workloads. Once the applications are migrated, the applications will continue from their previous state. Memory is transferred asynchronously so as not to prolong the blackout time.

After all applications and associated resources have been transferred over to the new LPAR, the original LPAR can be deactivated and its resources freed. The second LPAR assumes the identity of the original LPAR so that from an external perspective, there is no indication that a switch has been made from the original LPAR to the new LPAR. The result is that the applications and all user processes continue to run on what appears to be the same LPAR. All network connections are re-established after the migrations of the applications and their data in memory from the original LPAR to the new LPAR. From a user perspective, other than a brief blackout period where the applications are not responsive, there appears to be no change to the computing system other than the kernel/operating system patch/update has been applied and is being used. This preserves the workloads running on the LPAR. Active applications continue running with the same shared libraries that they were using previously on the original LPAR. Any new binaries that are executed will use the new updated shared libraries.

It can be seen from the above that there are no workload partitions (WPARs) required, or created, to achieve the movement of the applications, user processes, and data from the original LPAR to the new LPAR. As noted above, in the case of a mobile WPAR, all the processes/threads of the WPAR are tracked so that if the WPAR is moved, all the processes/threads and their associated file handles, IPCs, etc. that will need to be moved are known. The move is basically done on a process by process basis.

There are many differences between the mechanisms of the illustrative embodiments and the WPAR approach previously described above, although some of the same underlying technology that moves a process and its critical data in the WPAR approach is also utilized in the live operating system or kernel update mechanisms of the illustrative embodiments. One significant difference is how processes are identified to be moved from an original LPAR to the new LPAR. Not all user processes can be moved because the original LPAR must continue to run after the blackout period completes and applications are restarted on the new LPAR. This limitation is because the critical data for the user processes, stored in memory associated with the moved processes, is transferred asynchronously after the processes are restarted on the second LPAR. Thus, the original LPAR must be functional until all the process critical data in the memory has been moved.

As a result, there is a first set of core operating system services (referred to herein as "core" or "base" services) that will not be moved from the original LPAR to the new LPAR. These core operating system services will continue to run on the original LPAR. A second set of services is also defined that includes the services that are migratable from the original LPAR and those services determined to be necessary for booting the second LPAR to the point that the second LPAR can communicate with the original LPAR and receive the active workloads. It should be appreciate that the second set thus contains two types of services, those that are migratable and those that are boot services for booting the second LPAR. The boot services may comprise services similar to those of the core operating system services in the original LPAR but are separate instances of these services that are loaded and executed in the second LPAR rather than migrated from the original LPAR into the second LPAR.

With regard to the first set of core services, only a minimal set of services need to continue executing on the original LPAR. The first set of core services is a pre-determined list of services that are required to remain active on the original LPAR to complete the transfer of the migratable processes. A user can add to this pre-determined list of base processes such that third-party services that should not be migrated for various reasons can be added to the pre-determined list to thereby include them as core services that are not migratable. That is, because this first set of core services is small, a list data structure is defined that identifies which binaries should be treated as "base" processes that are required to be kept running in the original LPAR. The kernel maintains this list data structure and provides an interface through which the list data structure may be read, displayed to a user, and through which a user can identify binaries that should be added to the list, or otherwise edit this list data structure. The base processes need not be marked as base processes prior to the beginning of the live update operation of the illustrative embodiments.

The boot services in the second set of services are similar to the set of core services on the original LPAR in that they are a pre-determined list of services that are determined to be required to start up the second LPAR to the point where it is viable to receive the migratable processes from the first LPAR. This second set of services is also editable by users to add third party services to the pre-determined list for this second set of services.

Thus, there should be no overlap between the "migratable" set of services in the second set of services and the core services in the first set of services. There also should be no overlap between the "migratable" set of services in the second set of services and the boot services of the second set of services used to boot up the second LPAR. There will be some overlap between the core services of the first set of services and the boot services of the second set of services, but they will not be exactly the same. This is because there may be core services on the original LPAR that are not needed to start up the second LPAR and prepare it to receive the migratable processes. There may also be "transient" processes that are part of booting the second LPAR or configuring the second LPAR's devices that do not continue to run after the second LPAR is running and therefore, are not part of the core services listed for the original LPAR.

In addition to these differences, there are also some additional rules about the relationship between the base, or core, services (also referred to as "processes") and the services that are migrated to the second LPAR that are implemented by the mechanisms of the illustrative embodiments. First, the base (core) services (processes) will all be executed as children of an initialization (init) process or children of other base (core) services. Second, all the children of a core service are considered core services. Third, core services do not share resources with non-core services.

As mentioned above, the second set of non-migratable services that are started on the new LPAR are those services that must start running on the new LPAR to enable it to boot up with minimal services to be able to receive the workload being migrated from the first LPAR to the new LPAR. A customized initialization table data structure may be used to determine what services start on the new LPAR. Thus, with the mechanisms of the illustrative embodiments, after the new LPAR is booted to an up and running state, the "base" or "core" services listed in the first set of core services are maintained in the original LPAR. Then, the second LPAR is booted using the boot services specified in the second set of services and all other processes, services, and the like, including user space applications, are migrated to the second (new) LPAR by recreating the same processes on the second LPAR and then asynchronously migrating the data from the memory of the original LPAR to the memory in the second LPAR. The migrated services/processes are restarted on the second LPAR in exactly the same state as they ended their execution on the original LPAR. In the case of the boot services that are used to boot the second LPAR, these may contain similar services to the core services of the original LPAR but they are new instances of these core services rather than migrated services from the original LPAR.

One of the issues involved in the live updating of the operating system using the mechanisms described above is the management of the root file systems, e.g., /, /usr, /opt, /var, /tmp, and other root file systems, on the root volume group (rootvg) which is cloned to the second (new) LPAR. That is, during the live update process, the users that are running applications on the original LPAR need to be able to "see" or perceive the exact same root file systems (with the appropriate operating system updates) after the update as before the update to the operating system. For example, if an application creates a file in the /tmp directory, the exact same file must also exist after the live update to the operating system.

One solution to this issue that may be implemented with the illustrative embodiments is to utilize the rootvg on the second (new) LPAR when the user space (or simply "user") applications are restarted on the new LPAR. However, with this approach the user applications are frozen at the time of the migration from the old LPAR to the new LPAR, giving rise to the blackout period discussed above, and remain frozen during the boot and preparation of the new LPAR until the applications are restarted. This is done so as to ensure no updates to the root file systems during the migration which might cause an inconsistent view of the root file system from the user application standpoint. While this blackout period is significantly less than the downtime experienced when having to reboot a computing device as in the known mechanisms, it would be beneficial to minimize the length of blackout period if possible. Thus, it is desirable to provide mechanisms for allowing user applications to continue to run during the update of the operating system on the new LPAR, the boot and preparation of the new LPAR for acceptance of the migrated user applications, and the migration of the user applications to the new LPAR in which the updated operating system is provided.

One way in which this could be accomplished is to use a stacked virtual file system. In such an approach, user applications would access files via a top-level virtual file system which presents the files from either the old rootvg on the old (first) LPAR or the new rootvg (with the updated operating system) on the new (second) LPAR as appropriate based on how far the migration process has progressed and how far the merging of the user and application data from the old rootvg to the new updated rootvg has progressed. While this could be accomplished, it presents a very complex solution requiring a significant amount of management overhead to accomplish.

In addition, as mentioned above, it is desirable that the old LPAR and old rootvg continue to be usable for a period of time after the live update of the operation system has been performed since the old LPAR serves as a remote paging device for the asynchronous transfer of application memory via demand paging after the applications are started on the new LPAR. Moreover, an administrator needs to have the capability to fall back to the old (non-updated) operating system in the old rootvg of the old LPAR if needed, such as if there is an incompatibility between the application stack and the updated operating system, for example.

The illustrative embodiments further addresses these issues of user application availability and consistent view of the root file system during live operating system update operations while minimizing the blackout time period for user applications. The illustrative embodiments take advantage of the capability to mirror the original rootvg while the applications continue to run and then split the mirror after the applications have been frozen. The term "frozen" in this context means that the state of the applications are not allowed to change after a specified point in time and the applications are not permitted to complete writes to the file system or application (or user) space memory locations (referred to herein as "application memory"). One of the resulting mirrors generated due to the split continues to be used on the old (first) LPAR as a fall back rootvg until it is no longer needed, e.g., after all application memory has been migrated to the new LPAR, while the other mirrored rootvg is used as the root file system for applications that are restarted on the new (second) LPAR. For example, the root file system used by the applications may be specified using a change root (chroot) capability that restarts the applications so that their root file system is the split mirror rootvg file system on the new LPAR.

Thus, when an operating system of a LPAR of a host system is to be updated, the mechanisms of the illustrative embodiments may perform a live operating system update of the operating system on the LPAR by first creating a copy of the original LPAR root volume group (rootvg), which comprises the non-updated operating system, in the new LPAR (or already existing "surrogate" or second LPAR). This copy of the rootvg is then updated to generate a boot rootvg that is used to boot the new LPAR and prepare the new LPAR for migration of user applications.

In a parallel operation, the original rootvg is mirrored to a new rootvg on the old LPAR such that two instances of the original rootvg exist on the old LPAR. Thus, any updates to the rootvg are mirrored to both the original rootvg and the mirror rootvg on the old LPAR. The user applications are then frozen such that no additional execution of the application is permitted and no file system updates to the rootvg or application memory updates are performed by these frozen user space applications. The mirrored rootvg is then split from the original rootvg on the old LPAR, such as, for example, by executing a "splitvg" command on the original LPAR which stops the mirroring with one mirror continuing to be active while the other mirror is inactive. The resulting split mirrored rootvg is imported by the new LPAR.

After importing the split mirrored rootvg into the new LPAR, the applications are restarted on the new LPAR with their rootvg changed so that they are using the root file system of the imported mirrored rootvg, not the boot rootvg that was used to boot the new LPAR. The old LPAR continues to run with the original rootvg that was mirrored to provide remote paging for the demand paging of application memory until all the data in the application memory of the old LPAR is transferred to the new LPAR. "Demand" paging refers to pages of the application memory associated with the old LPAR being transferred to application memory associated with the new LPAR in response to the migrated applications on the new LPAR requesting access to an address location of the application memory corresponding to the page, i.e. the pages of application memory are migrated on a page by page basis in response to demands to access those pages by the migrated application, thereby allowing asynchronous transfer of the application memory, rather than migrating the entire application memory over to the new LPAR in a synchronous manner.

The new mirror rootvg on the new LPAR is updated to the new level of the updated operating system, i.e. the updates to the operating system performed to the boot rootvg are applied to the operating system instance in the new mirror rootvg. This update will function like a standard operating system update applied to a running system however no reboot is required because the new LPAR is already running the operating system with the update applied due to the use of the boot rootvg that was already updated.

After the asynchronous application memory transfer is complete, the original rootvg in the old LPAR can be used as a fall back operating system if needed, e.g., in the case of an error due to the operating system update being experienced. Alternatively, the original rootvg on the old LPAR can be removed if no longer needed after the asynchronous application memory is completed. It should be appreciated that if the new LPAR ever needs to be rebooted, the new mirrored rootvg will be used as the boot rootvg and the temporary boot rootvg previously used to boot the new LPAR as part of the live operating system update operation will not be used for such a boot operation and may in fact be removed after reboot of the new LPAR.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
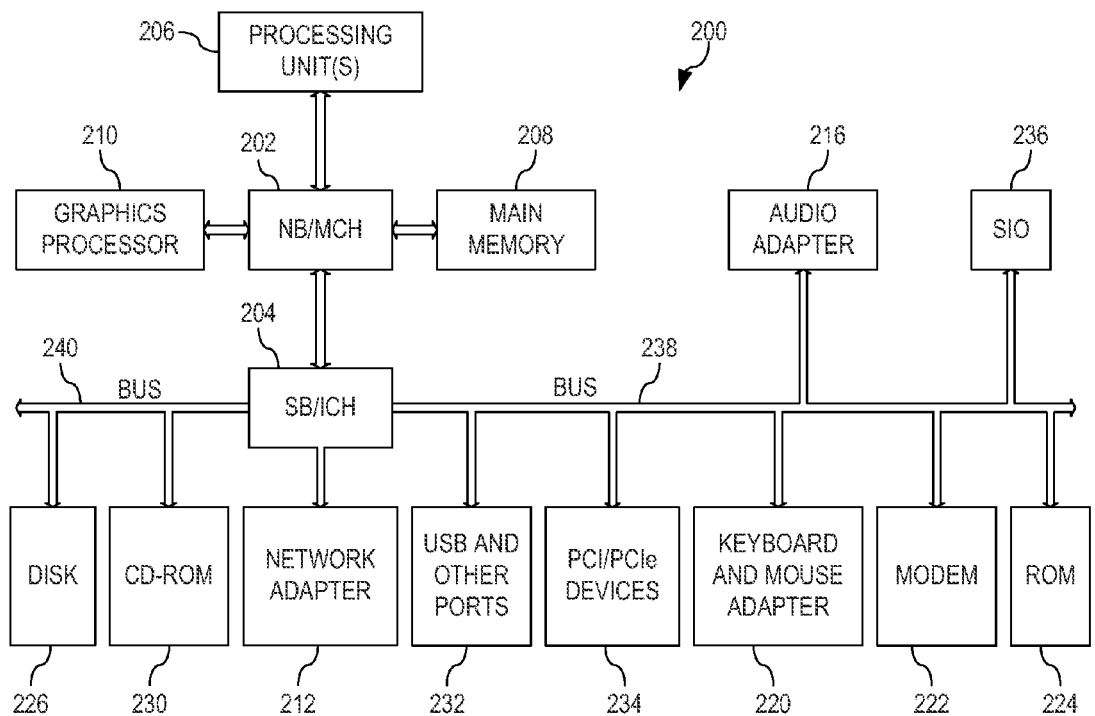
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In accordance with the illustrative embodiments, one or more of the computing devices in FIG. 1, e.g., servers 104, 106, client computing devices 110-114, or the like, may implement a logically partitioned environment in which the particular computing device hosts one or more logical partitions (LPARs). These logical partitions each comprise an instance of an operating system, such as the AIX operating system, which is used to run user space applications in a virtualized environment such that the user space applications appear to have access to all of the resources of the computing device hosting the LPAR in which it executes.

Periodically, the operating system running in one or more LPARs may need to be updated or patched. Such updates or patches may be electronically distributed to the various computing devices of the network 100 in FIG. 1 automatically, or the update may be manually initiated by a system administrator or the like. For example, an operating system may periodically poll a computing device associated with a provider of the operating system to determine if there is an update or patch available for the operating system. If so, the update or patch may be downloaded from the providers' computing device to the computing device executing an operating system that needs to be updated/patched.

As mentioned above, in known mechanisms, in order for the update/patch to be applied to the operating system instance executed in a logical partition of a computing device, the logical partition and/or the computing device as a whole, must be restarted. This causes a significant downtime for application users and furthermore, requires users' to resubmit their workloads to the logical partition for execution. Moreover, if workload partitions (WPARs) are utilized to facilitate dynamic updating/patching of operating system instances, the scope of updates possible is limited as noted above and requires significant overhead to accomplish due to the need to track the activities of every process and thread inside the mobile WPARs, thereby reducing performance.

With the mechanisms of the illustrative embodiments, a clone of the root volume group (rootvg) of an operating system instance of a LPAR is generated and updated by the update to the operating system and then used to boot a new LPAR. Once the new LPAR is up and running, application instances running in the original LPAR are migrated to the new LPAR. The actual movement of the application instances involves checkpointing the application instances on the old LPAR and passing this state information to the new LPAR where application instances are started on the new LPAR and initialized with the checkpointed state. Once migrated, the application instances are immediately available to user processes. The application data is then asynchronously copied from the memory associated with the original LPAR to memory associated with the new LPAR. Once the application and its associated data are moved over to the new LPAR, then the original LPAR and its resources may be freed for reuse. The new LPAR assumes the identity of the original LPAR so that from an external perspective there is no indication that the switch between the original LPAR and the new LPAR has occurred. That is, the network connections from client systems are preserved/recreated on the new LPAR with network activity being blocked only during the brief blackout period. Once the application instances are reactivated on the new LPAR with the checkpointed state, the application instances can continue communicating with the client systems at the same point where they left off prior to the migration.

Thus, while the update of the operating system is being performed, user space processes and users themselves may interact with the application instances executing in the original LPAR. When the update of the operating system is complete, the new LPAR stands in for the old LPAR, however the new LPAR has the update applied to the operating system via the update being performed on the cloned copy of the root volume group from the old LPAR, where the root volume group comprises the operating system image, shared libraries, OS commands, user definitions, device configuration database, and the like. Thus, a seamless live update of the operating system is made possible without having to restart workloads or otherwise significantly disrupt already executing applications and workloads. Moreover, updates to user-space binaries, including shared libraries and the like, may be performed using the mechanisms of the illustrative embodiments.

Figure 3:
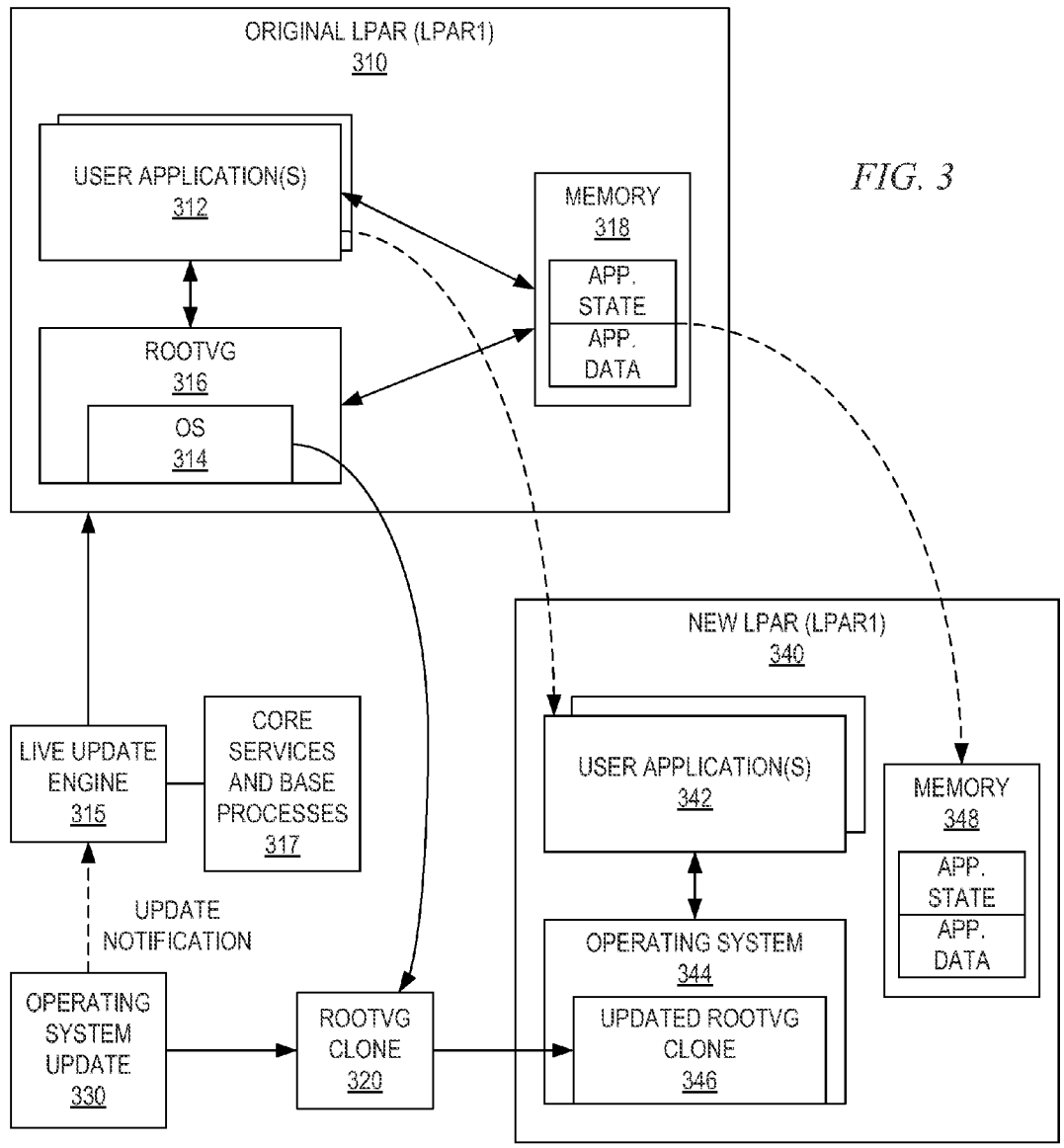
FIG. 3 is an example diagram illustrating an update/patch operation for performing a live update of an operating system in accordance with one illustrative embodiment.

FIG. 3 is an example diagram illustrating an update/patch operation for performing a live update of an operating system in accordance with one illustrative embodiment. The elements shown in FIG. 3 may be implemented within a computing device implementing virtualized environments including one or more logical partitions. This computing device, in one illustrative embodiment, is a server computing device in which multiple logical partitions are implemented, e.g., one for each client computing device accessing the server computing device. Of course, this is only an example and any implementation in which the illustrative embodiments are used to update or patch an operating system instance in a logical partition of computing device resources is considered within the spirit and scope of the illustrative embodiments.

As shown in FIG. 3, initially a logical partition, i.e. the original logical partition (LPAR1) 310, is running in the computing system 300. An operating system instance 314 is executed within LPAR1 310 having a root volume group (rootvg) 316. User space applications 312 are executed within LPAR1 via the operating system instance 314. The applications 312 have application state data and application data stored in memory 318. The application state data specifies the execution state and control structures associated with the execution of the applications 312. The application data is the data upon which the applications 312 operate to perform their functions.

The computing device 300 further comprises a live update engine 315 and core services and base processes listing data structure 317. The live update engine 315 comprises logic for orchestrating and performing the operations to facilitate the live update of the operating systems 314 in logical partitions hosted by the computing device 300. The core services and base processes listing data structure 317 lists the core services and base processes that cannot be migrated to the new logical partition (LPAR2) 340 when performing the live update of the operating system 314 and must be maintained in the original LPAR1 310 while the live update operation is being performed.

It should be appreciated that while the live update engine 315 is shown in FIG. 3 as a separate engine from the original LPAR 310 and new LPAR 340, the live update engine may in fact be split across the LPARs 310 and 340 such that a live update command may be initiated in the original LPAR 310 to begin the live update operation and the processes of the live update may be migrated over to the new LPAR 340 along with application instances 342. The live update command may start two additional processes, one is a base process that stays behind on the original LPAR 310 and a second that is started from the initialization table on the new LPAR 340 to manage the receiving end of the migration operation. However, for simplicity of the depiction in FIG. 3, the live update engine 315 is shown as a separate entity from the original LPAR 310 and new LPAR 340 and will be described as such hereafter for ease of explanation.

As shown in FIG. 3, an operating system update or patch 330 may be received in the computing device 300 for updating/patching the operating system instances 314 running in the logical partitions hosted by the computing device 300. As mentioned above, this operating system update/patch 330 may be pulled down from a source computing device by the computing device 300, e.g., downloaded from a operating system provider computing device in response to a polling for updates by the computing device 300. Alternatively, the operating system update/patch 330 may be pushed to the computing device 300, such as in a case where computing devices implementing an operating system are registered with the provider of the operating system and the provider pushes updates/patches to the registered computing devices. The operating system update/patch 330 is a portion of code to replace or augment the operating system 314 and must be installed in the logical partition 310 for updating/patching the logic executed as part of the operating system 314.

Regardless of the manner by which the operating system update/patch 330 is received, the live update engine 315 is informed of the need to update/patch an operating system type, e.g., AIX, Linux, or the like (there may be different operating systems executing in different LPARs on the same computing device 300), in response to receiving the operating system update/patch 330 (hereafter referred to simply as the operating system update 330). In response to being informed of the need to update/patch the operating system 314, the live update engine 315 identifies the logical partitions executing instances of the operating system type to be updated/patched. The live update engine 315 then initiates and orchestrates the live update of the operating system instances in these LPARs in the manner described hereafter. For purposes of illustration, it will be assumed that the computing device 300 currently is hosting a single LPAR, i.e. LPAR1 310, that is executing an instance of the operating system that is to be updated/patched by the operating system update 330.

To initiate the live update operation, the live update engine 315 generates a clone, or copy, of the root volume group (rootvg) 316, including the operating system 314 that is to be updated/patched, in another storage location, e.g., another location on a same or different hard disk drive, flash memory, solid state memory device, or the like. The resulting rootvg clone 320 contains the operating system kernel, user space binaries (e.g., shared libraries), and the like, which are updated/patched using the received operating system update 330. This results in an updated/patched rootvg clone 346 which is used to boot a new logical partition (LPAR2) 340. The updated operating system logic in the updated rootvg clone 346 is executed in the new logical partition (LPAR2) 340 to boot LPAR2 340 to an up and running state so that it may be used to execute user applications.

The core services and base processes data structure 317 sets forth a list defining the services and processes that cannot be migrated from the operating system 314 to the operating system 344 as part of the operating system update/patch operation. All other services and processes of the operating system 314 may be migrated to the operating system 344.

As mentioned above, not all process can be migrated to the operating system 344 of the new LPAR2 340 because the original LPAR1 310 must continue to run after the new LPAR2 340 is up and running and while the migration of the application instances 312 and restarting of the application instances 312 in the new LPAR2 340 is being performed. This is because the application data in the memory 318 associated with the moved application instance 312 processes is transferred asynchronously after the application instance 312 processes are restarted on the new LPAR2 340 such that the original LPAR1 310 must be functional until all the application data in the memory 318 has been moved to the memory 348 associated with the new LPAR2 340. Thus, there is a set of core operating system services that will not be moved and will continue to run on the original LPAR1 310. Because this set is small, the core services and base processes data structure 317 stores the list identifying which binaries should be treated as core or "base" processes. The operating system kernel of the operating system 314 may keep this listing data structure or it may be associated with the live update engine 315 as shown. The operating system kernel and/or live update engine 315 may provide an interface whereby a user may edit the list of core services and base processes, e.g., adding additional services/processes to be considered core or base processes so that they are not migrated when the operating system is updated.

The particular core and base processes that are part of the listing in the core and base process data structure 317 follow defined rules specifying the relationship between these core and base processes and processes that may be moved from the original LPAR1 310 to the new LPAR2 340. First, the base processes will all run as children of the initialization process or children of other base processes. Second, all the children of base processes are also considered base processes. Third, base processes do not share resources with non-base processes.

Services and processes that are not part of the listing data structure 317 are considered migratable. The new LPAR2 340 is booted with a minimum set of services, present as part of the new copy of the operating system on LAPR2 340, that must start running on the new LPAR2 340 to enable it to boot up and receive workloads being moved from the original LPAR1 310. The services needed to boot the new LPAR2 340 may be specified in a customized initialization table associated with the operating system instance 314 and may be stored in the rootvg 316 that is cloned and updated to enable the booting up of the new LPAR2 340.

Once LPAR2 340 is up and running, the application instances 312 are migrated to the new LPAR 340 as application instances 342. There is a brief blackout time during this move of the application instances 312 to the new LPAR 340. During this brief blackout time, the application instances 312 are not responsive as the processes of the application instances are checkpointed, moved, and restored on the new LPAR 340. The application instances 342 will then continue execution from their previous state but on the new LPAR2 340 as application instances 342. The application data from the memory 318 is transferred to the memory 348 associated with the new LPAR2 340 in an asynchronous manner so as not to prolong the blackout time period where the application instances are not responsive. After all applications and associated resources have been transferred over to the new LPAR2 340, the original LPAR 310 is deactivated and its resources are freed up for reuse. The new LPAR2 340 assumes the identity of the original LPAR1 310 by configuring the network connections of LPAR2 340 with the same hostname and network address, e.g., IP address, that was used by LPAR1 310 such that any subsequent contacts from client systems on the network will be routed to the new LPAR2 340 and its application instances.

Thus, from the viewpoint of an external process or user, there is no indication that there has been a switch over from the original LPAR1 310 to the new LPAR2 340. Hence, the application instances 312 continue to run on what appears to be the same LPAR1 310 when in fact the application instances 312 are new application instances 342 in a new LPAR2 340 executing at a same checkpointed state and using the same application data as was present in the original LPAR1 310 prior to the update. From a user perspective, other than the brief blackout period, there appears to be no change to the system other than the update/patch has been applied. This preserves the application instances and workloads running on the original LPAR1 310. Active applications continue running with the same shared libraries that they were using previously on the original LPAR1 310. Any new binaries that are executed will use the new updated shared libraries.

Figure 4:
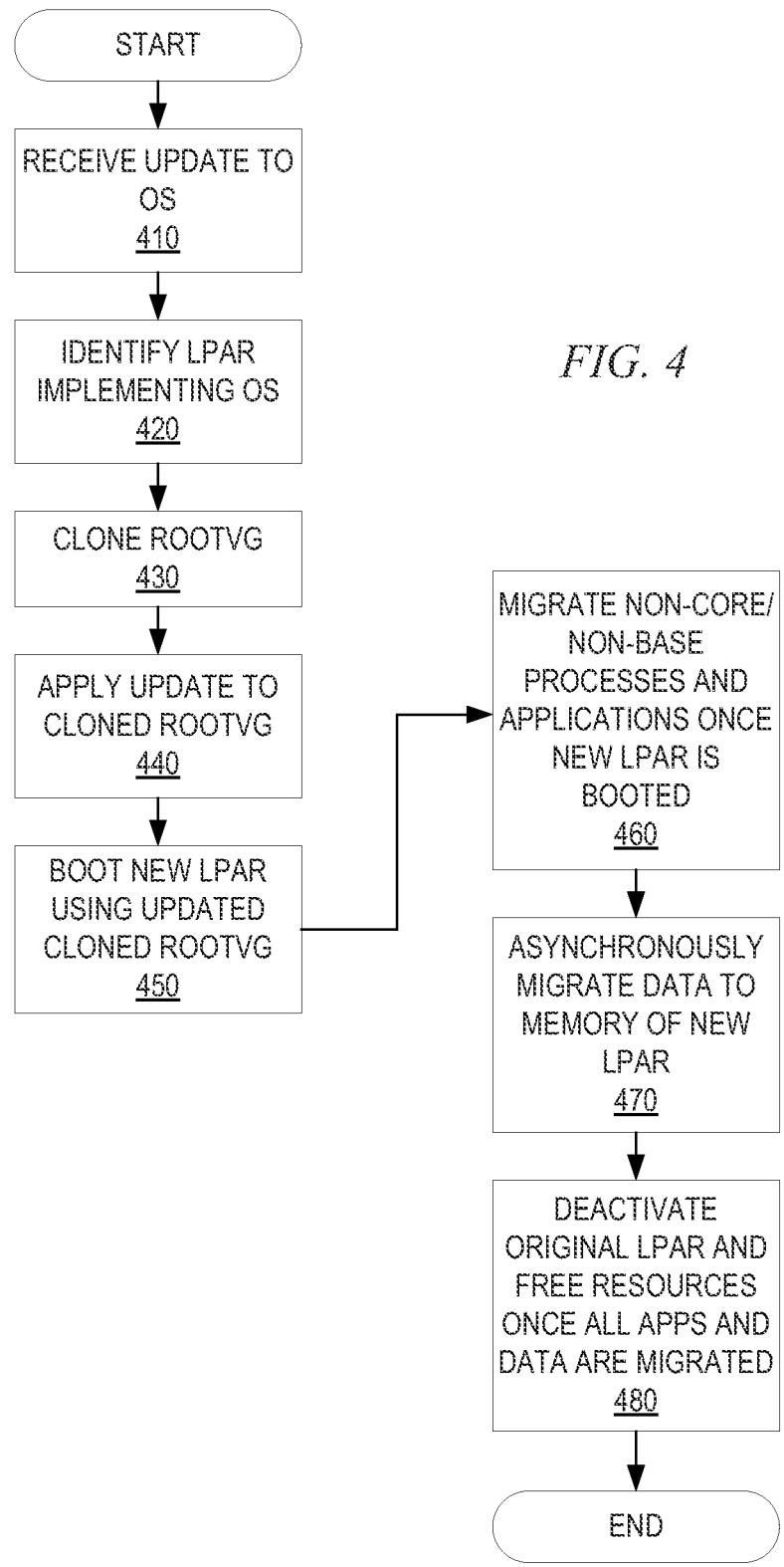
FIG. 4 is a flowchart outlining an example operation for performing a live update of an operating system in accordance with one illustrative embodiment.

FIG. 4 is a flowchart outlining an example operation for performing a live update of an operating system in accordance with one illustrative embodiment. As shown in FIG. 4, the operation starts by receiving an update to the operating system to be applied (step 410). A logical partition implementing the operating system to be updated is identified (step 420) and the root volume group of the operating system executing in this original logical partition is cloned (step 430). The update is applied to the cloned root volume group to generate an updated cloned volume group (step 440). The updated cloned volume group is used to boot a new logical partition (step 450). Once the new logical partition is booted, non-core or base processes are migrated to the new logical partition and application instances running in the original logical partition are migrated to the new logical partition (step 460). The application data for the application instances are asynchronously migrated to the memory associated with the new logical partition (step 470). Once all application instances and application data are migrated to the new logical partition, the original logical partition is deactivated and its resources freed (step 480). The operation then terminates.

Figure 5:
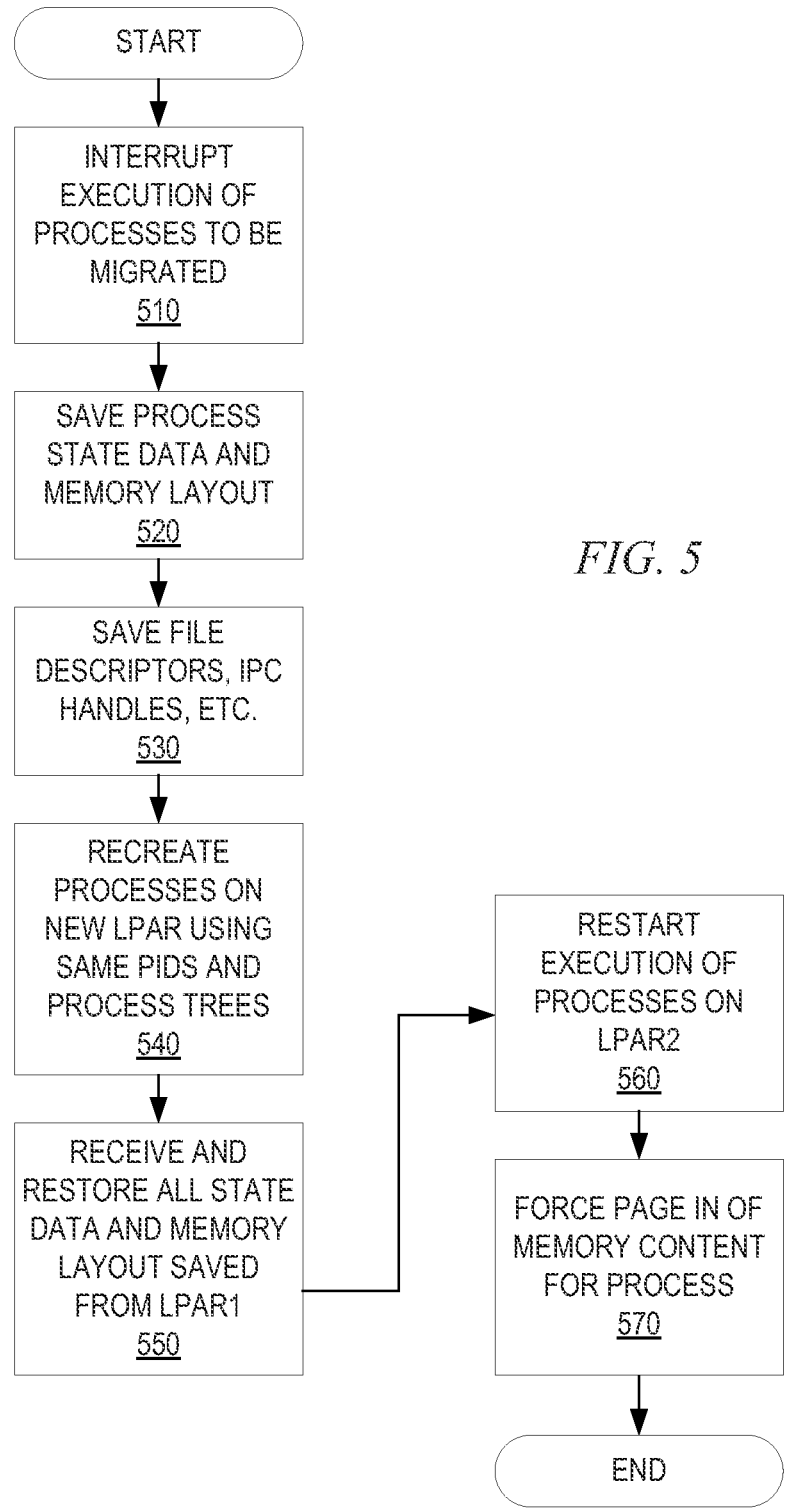
FIG. 5 is a flowchart outlining an example operation for performing the migration of processes from a first logical partition to a second logical partition as part of a live update operation in accordance with one illustrative embodiment.

FIG. 5 is a flowchart outlining an example operation for performing the migration of processes from a first logical partition to a second logical partition as part of a live update operation in accordance with one illustrative embodiment. As shown in FIG. 5, the operation starts with interruption of the execution, on LPAR1, of the processes that are to be migrated from LPAR1 to LPAR2 (step 510). A text segment of each process is overlayed with special code to save the process' state data and memory layout (step 520). That is, each executing code, or process, has a text segment and a data segment. The text segment contains the compiled code, i.e. the instruction stream to be executed for that program. A system loader keeps track of where each program's text and data segments are in memory. Thus, step 520 replaces the original code of the program with a special code that drives the collection of the code (or process) state. After saved state data is restored on the second LPAR (discussed hereafter with regard to step 560), the original text segment for the original code is restored on the second LPAR (LPAR2) thereby reloading the program from storage into memory.

In addition, file descriptors, IPC handles, and other state data for the processes are saved for use in recreating the processes on the new logical partition, i.e. LPAR2 (step 530). On the new LPAR, i.e. LPAR2, all processes that are to be migrated are recreated using the same process identifiers (PIDs) and the same process tree (step 540). That is, each process has a parent-child relationship with other processes and the process tree identifies these associations and is used to recreate the correct relationships of processes on the new LPAR. The operation of step 540 loads the binary, which may be a user application instance, from the cloned rootvg into the process space.

The text segment of each process is again overlaid with special code to receive and restore all the state data saved from LPAR1 (step 550). This state includes the memory layout of the stack and heap, etc., but not the content of the memory. The original text segment of the processes is then restored and execution of the process is restarted at the instruction the process was ready to executed on LPAR1 (step 560). Thereafter, all pages of memory belonging to each of the processes are "touched" or accessed to force the memory content to be paged in (step 570). For pages that were paged out on LPAR1, these pages get paged in from the paging device. For pages that were in memory on LPAR1, the paging device has a mapping of them and the paging device reads these pages and pages them in to LPAR2. The operation then terminates.

Thus, the illustrative embodiments provide mechanisms for performing live updates/patches of operating systems executing in virtualized environments, e.g., within logical partitions of a computing device. The illustrative embodiments provide such live update/patch functionality without having to shut down and restart application instances or workloads and/or the computing device. In addition, the illustrative embodiments avoid the performance penalty associated with having to track processes, threads, and associated resources prior to the update/patch operation being performed and instead allows such information to be identified after the live update process is initiated. The illustrative embodiments handle the cloning of file systems and updating of the operating system image automatically as part of the live update process and do not require a second active LPAR to be in place prior to the live update process being initiated. Furthermore, the illustrative embodiments can provide automatic provisioning of processor and memory resources to the new LPAR and subsequent de-provisioning of the resources owned by the original LPAR. Applications continue to run on what appears to be the same LPAR as prior to the update/patch operation. For management of the workloads, there is no added complication of moving from one LPAR to another within a WPAR. Furthermore, the illustrative embodiments do not have the WPAR's limitations on what applications can be included in the update/patch. The update/patch is accomplished without the use of a WPAR.

As mentioned above, some of the issues involved in the live updating of the operating system using the mechanisms described above is the management of the root file system on the root volume group (rootvg) which is cloned to the second (new) LPAR such that a consistent view of the file system is available both before and after the migration of user applications to the new LPAR (also sometimes referred to as the "surrogate" LPAR), and application availability during the live update of the operating system. The illustrative embodiments further address these issues of user application availability and a consistent view of the root file system during live operating system update operations while minimizing the blackout time period for user applications by providing a process of root volume group mirroring and migration from the first (old) LPAR to the second (new or "surrogate") LPAR.

FIGS. 6A-6F illustrate an example operation for performing a live operating system update with consistent root file system views and minimum application blackout time in accordance with one illustrative embodiment. It should be appreciated that the live operating system update operation outlined in FIGS. 6A-6F is similar to the live operating system update process previously described above with regard to FIGS. 3-5 but which is augmented to provide a consistent view of the root file system in the root volume group (rootvg) for the user applications that are to be migrated and which allows user applications to remain available to users for a majority of the time that the live operating system update is being performed with only a minimal blackout time period. The illustrative embodiment shown in FIGS. 6A-6F takes advantage of the capability to mirror the original rootvg while the applications continue to run and then split the mirror after the applications have been frozen.

Figure 6A:
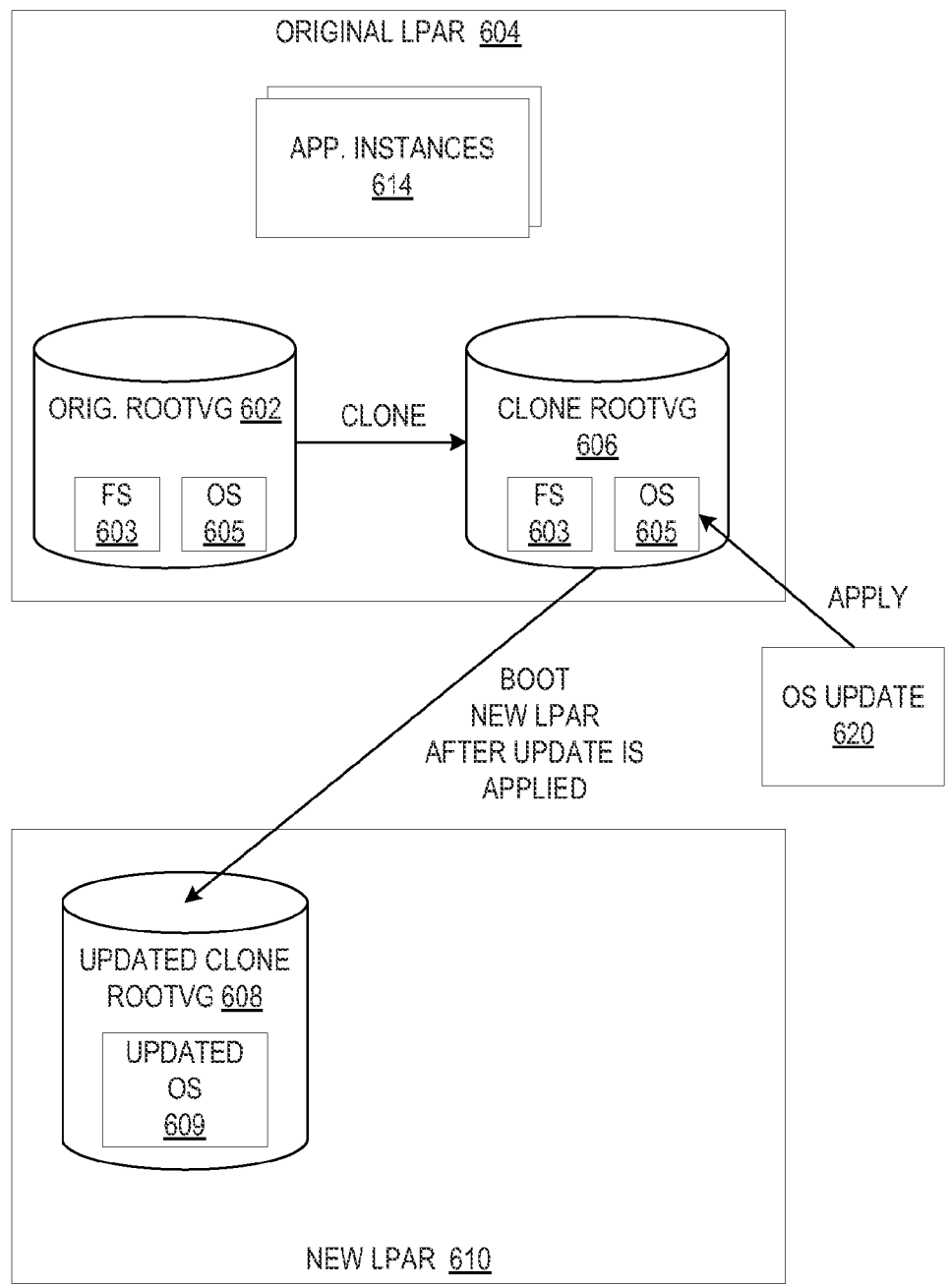
FIGS. 6A-6F illustrate an example operation for performing a live operating system update with consistent root file system views and minimum application blackout time in accordance with one illustrative embodiment.

With reference now to FIG. 6A, as shown in this figure, a first operation performed during the live operating system update is to clone the original rootvg 602 of the original (also referred to as the "first" or "old") LPAR 604. As mentioned earlier, the rootvg 602 stores the root file system 603 for the LPAR 604. Thus, data accessed by the application instances running in LPAR 604 will access this data via the root file system 603 and thus, it is important that when these applications are migrated to the new LPAR 610, a consistent view of the data in the root file system 603 is maintained in the migrated rootvg of the new LPAR 604. The following operation set forth in FIGS. 6A-6F ensures that such a consistent view is maintained throughout the migration operation.

The clone 606 of the original rootvg 602 may be generated in the manner previously described above for booting the new (also referred to as the "second" or "surrogate") LPAR 610 after first updating the clone 606 with the operating system update. As shown in FIG. 6A, for example, a disk copy operation may be performed to copy the original rootvg 602 to generate the clone rootvg 606, which is then updated to generate updated rootvg clone 608. The updating of the clone rootvg 606 involves the application of operating system updates 620 to the original operating system 605 already present in the original rootvg 602. The updated rootvg clone 608, comprising updated operating system 609, is used to boot the new LPAR 610. This operation corresponds to steps 410-450 in FIG. 4, for example.

Figure 6B:
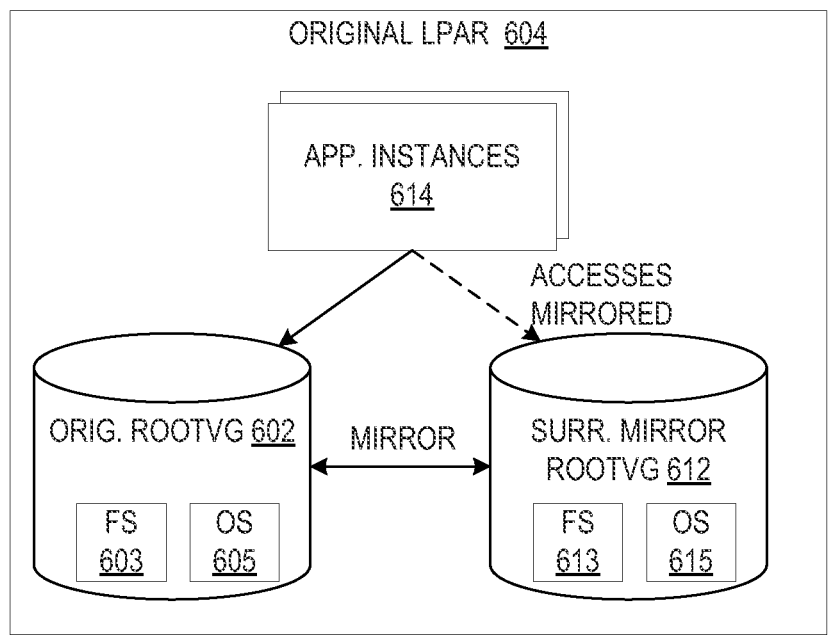
Figure 6B:
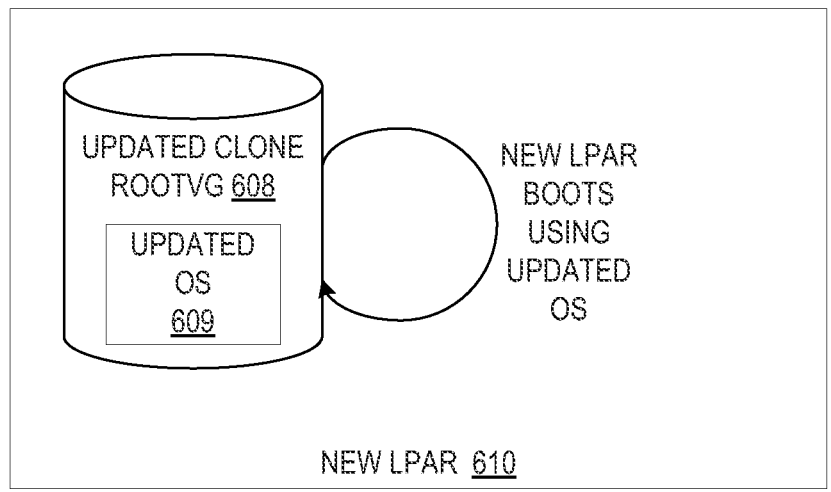

Referring now to FIG. 6B, in parallel with the booting of the new LPAR 610 using the updated rootvg clone 608, a mirror copy of the original rootvg 602 is generated using a mirroring operation within the original LPAR 604. It should be noted that the mirror copy of the rootvg, referred to herein as the surrogate mirror rootvg 612, also stores a mirror copy 613 of the original file system 603 and a copy 615 the operating system 605. Because the surrogate mirror rootvg 612 is a mirror copy of the original rootvg 602, any modifications to data in the file system 603 are mirrored to the file system 613 in the surrogate mirror rootvg 612. In addition, the original rootvg 602 and surrogate mirror rootvg 612, at this point in the live operating system update operation, do not have the operating system update applied to them. To the contrary, the only rootvg that has been updated at this point is the updated rootvg clone 608 used to boot the new LPAR 610.

It should be appreciated that before, during, and after the process for performing the live operating system update with rootvg mirroring as shown in FIGS. 6A-6F, the original rootvg 602 remains operational and accessible via the original LPAR 604. Thus, the original rootvg 602 serves as a fall back rootvg until it is no longer needed, e.g., after all application memory has been migrated to the new LPAR 610, while the surrogate mirror rootvg 612 is used as the root file system for applications that are restarted on the new LPAR 610, as described hereafter. Hence, there are three different root volume groups used in this process:

(1) the original rootvg 602 which serves as the basis for cloning and mirroring to perform the live operating system update, serves to keep the original LPAR 604 functional during the live operating system update until application memory is fully migrated, and further serves as a fall-back rootvg should an error occur or changes need to be rolled-back;

(2) the clone copy of the rootvg 606 to which the operating system update is applied to generate the updated rootvg clone 608 which is used to boot the new LPAR 610 implementing the operating system updates; and (3) the surrogate mirror rootvg 612 which is used to facilitate migration of applications from the original LPAR 604 to the new LPAR 610 with consistent file system view and minimal blackout time for the applications.

It is important to note the different rootvgs used in this process since each rootvg serves a different purpose to facilitate the updating of the operating system and the minimal interruption to application availability during the live operating system update.

Figure 6C:
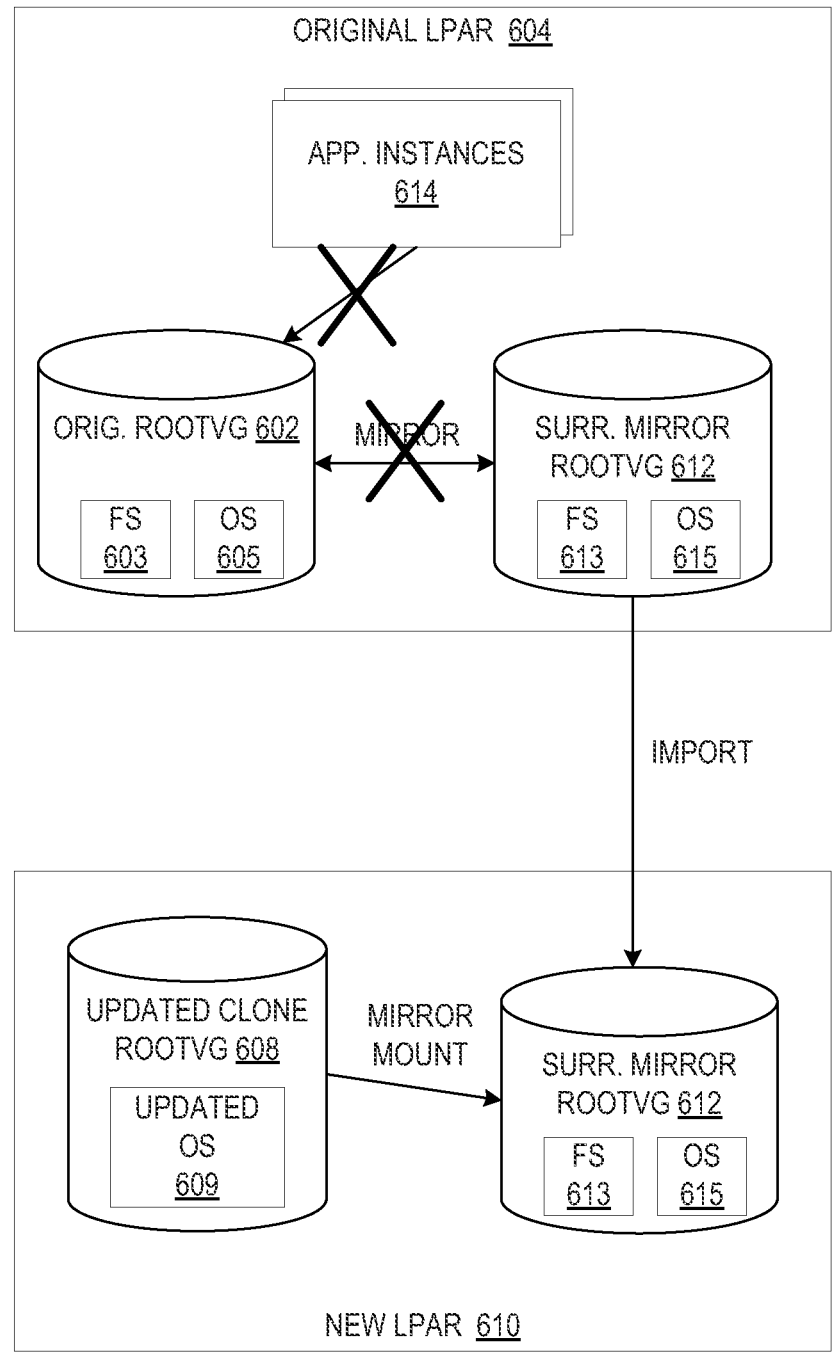

With reference now to FIG. 6C, having generated the surrogate mirror rootvg 612, application instances 614 are permitted to keep executing while the live operating system update operation is being performed up until a point at which the application instances 614 are frozen. This point in the operation is just prior to a split of the mirroring operation and importation of the surrogate mirror rootvg 612 into the new LPAR 610. Up until this point, access by application instances 614 may be made to the data in the root file system 603 of the original rootvg 602 and mirrored to the mirror file system 613 in the surrogate mirror rootvg 612. However, once this mirroring is discontinued, any accesses, e.g., writes, modifies, or the like, would occur only with regard to the original rootvg 602 and file system 603 and would not be mirrored to the mirror file system 613 and surrogate mirror rootvg 612.

In other words, as shown in FIG. 6C, at a point in time after the new LPAR 610 has been booted using the updated rootvg clone 608 such that the new LPAR 610 is executing, the application instances 614 have their execution frozen such that they do not continue to execute and do not commit or complete any writes, modifies, or updates to the root file system 603 of the original rootvg 602. This is to prevent the root file system 603 of the original rootvg 602 presenting a different view of the file system and application data than is provided by the mirrored file system 613 in the surrogate mirror rootvg 612 due to a write, modify, or update being performed to the original rootvg 602 after the mirroring has been discontinued. The "freezing" of the application instances 614 may comprise operations for interrupting the execution of the application instances, storing the state data and memory layout, saving file descriptors, instruction pointer counters, handles, etc. as previously discussed above with regard to FIG. 5 and operations 510-530, for example.

Once the application instances 614 are frozen, the mirror relationship between the original rootvg 602 and the surrogate mirror rootvg 612 is severed or "split" (also referred to as "splitting the mirror") such that mirroring of accesses to the original rootvg 602 on the surrogate mirror rootvg 612 is discontinued. Thus, two independent copies of the original rootvg 602 are created, i.e. the original rootvg 602 and the surrogate mirror rootvg 612 which, at the point of severing, should have the same file system view in the file systems 603 and 613 from the perspective of the application instances 614.

The surrogate mirror rootvg 612 is then imported into the new LPAR 610 by the updated clone rootvg 608 performing a mounting operation to mount the surrogate mirror rootvg 612 for use by application instances in the new LPAR 610. In one illustrative embodiment, the mounting operation may comprise two primary steps. A first step may comprise executing an "importvg" command on the new LPAR 610 to import and activate the surrogate mirror rootvg 612 on the new LPAR 610 so that the file systems on the volume group are available to mount. The second step may comprise executing a "mount" command on the new LPAR 610 to make the file systems of the surrogate mirror rootvg 612 accessible at the given locations (mount points).

At this point, the surrogate mirror rootvg 612 which has been imported to the new LPAR 610 has the same state as the original rootvg 602 in the original LPAR 604 and has not been updated with the operating system update. Moreover, the application instances have been frozen so that they are not performing any access operations to the file system 603 of the original rootvg 602.

Figure 6D:
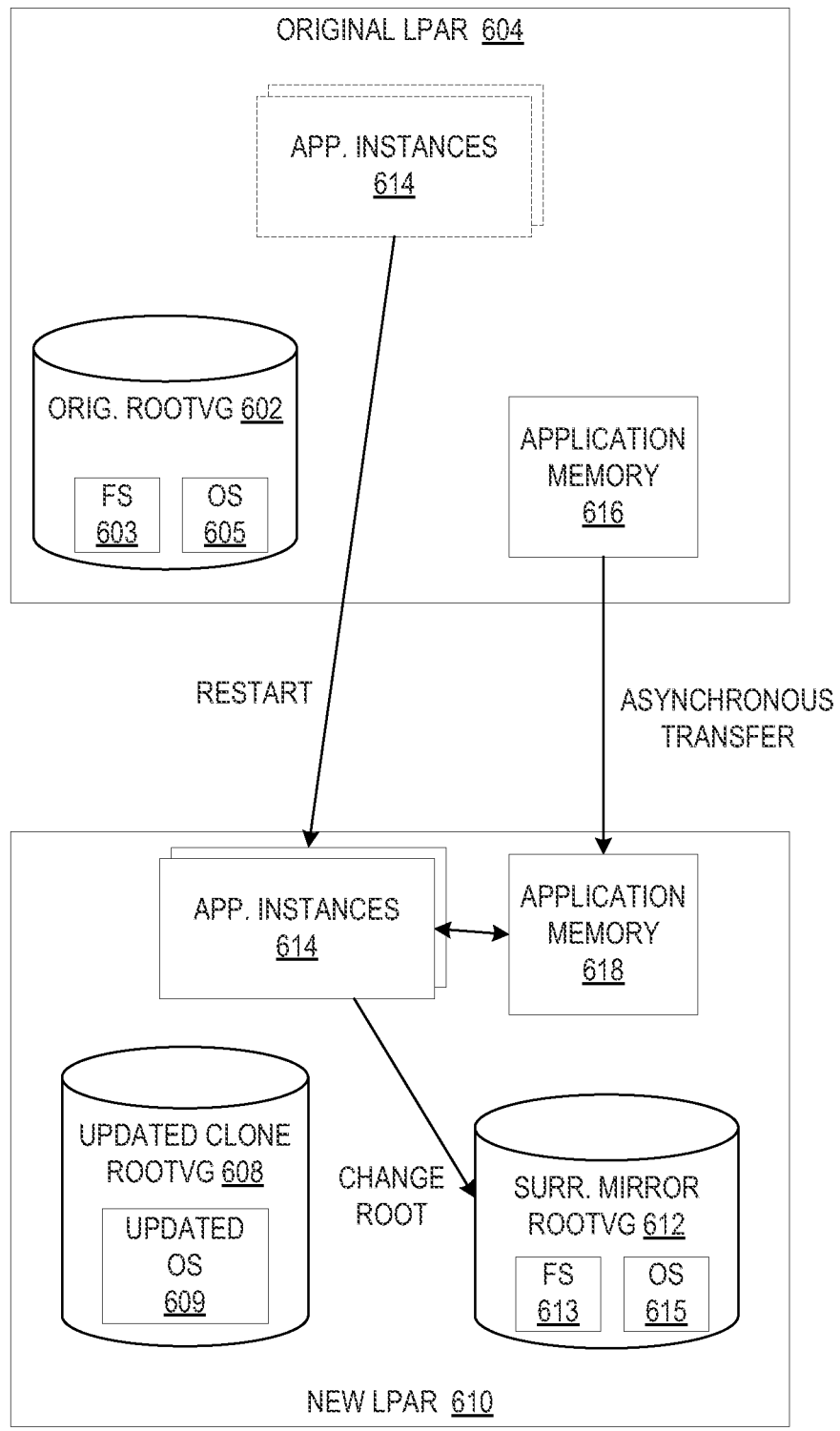

With reference now to FIG. 6D, the frozen application instances 614 are restarted in the new LPAR 610. This restarting of the application instances 614 may comprise, for example, recreating the processes in the new LPAR 610 using the same process identifiers, process trees, restoring all state and memory layout data stored from the freezing of the application instances 614 in the original LPAR 604, and the like. The execution of the application instances 614 may then be restarted in the new LPAR 610. This is similar to the operations outlined in FIG. 5 above with regard to operations 540-560. However, with regard to this illustrative embodiment, an additional operation is performed to change the root file system used by the application instances to the root file system 613 in the imported surrogate mirror rootvg 612. This can be done using a change root (chroot) instruction, for example. Thus, the application instances 614 are restarted on the new LPAR 610 using the surrogate mirror rootvg 612 as their rootvg and file system.

Application data for the application instances 614 in the application memory 616 of the original LPAR 604 is asynchronously transferred to the application memory 618 for the restarted application instances 614 in the new LPAR 610. That is, in one illustrative embodiment, the application data is transferred "on-demand" as the application instances 614 in their new LPAR 610 environment request access to pages of application memory. In response to such requests, the corresponding pages are transferred from application memory 616 to application memory 618 and then accessed by the application instances 614 in the new LPAR 610. During this process, the original rootvg 602 acts as the file server for the asynchronous memory transfers until all of the application memory 616 data is transferred to the new LPAR 610 application memory 618 at which point the original rootvg 602 may be halted and removed.

Figure 6E:
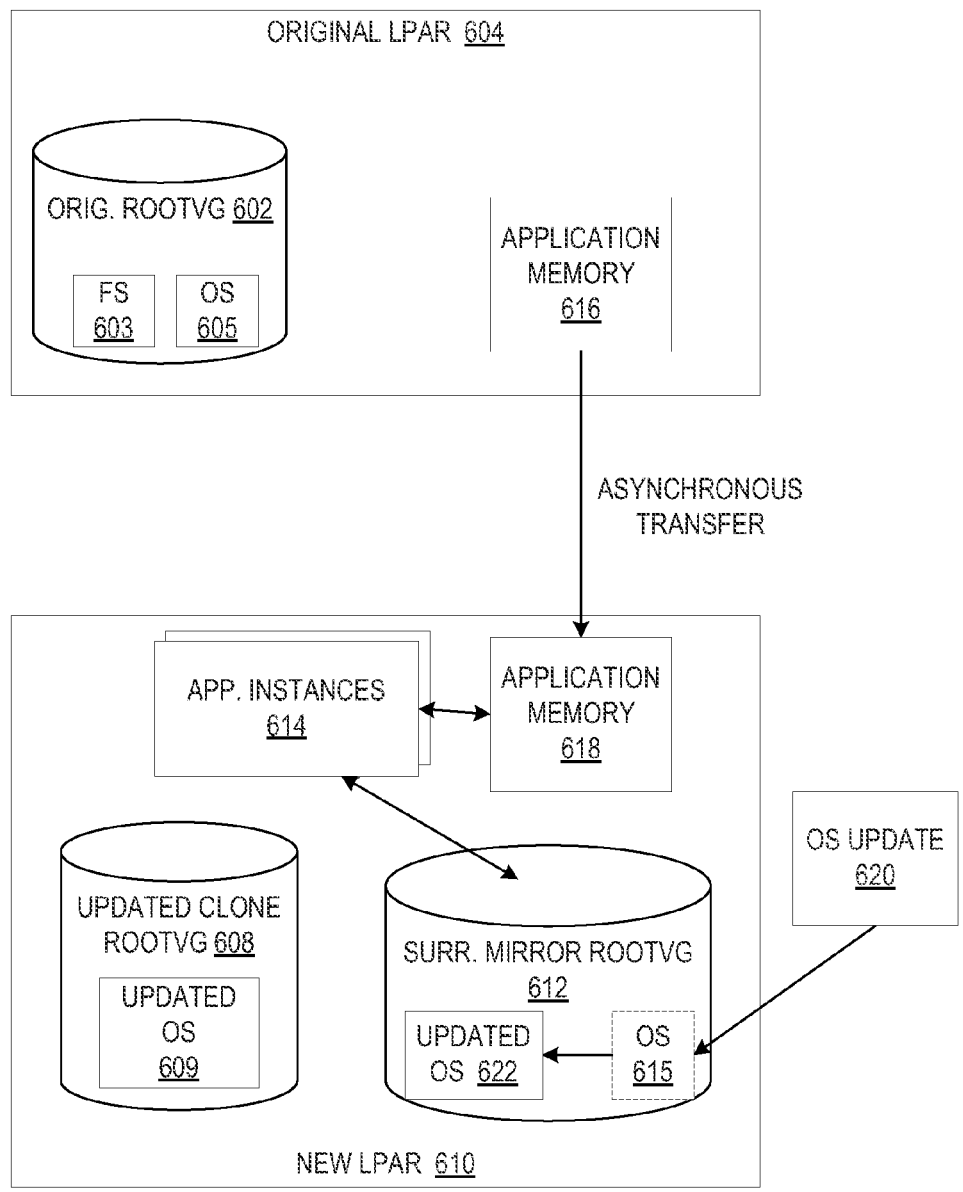

With reference now to FIG. 6E, at this point in the operating system live update operation, the surrogate mirror rootvg 612 still does not have the operating system updates 620 applied to it and is running a non-updated operating system 615 (which is a copy of the non-updated operating system 605 in the original rootvg 602 in the original LPAR 604). The updated clone rootvg 608 does have the operating system updates 620 applied as previously mentioned in the description of FIG. 6A. Thus, the new LPAR 610 has been booted using the updated operating system 609 in the updated clone rootvg 608 but the application instances 614 are utilizing a rootvg 612 that has not yet been updated.

As shown in FIG. 6E, the imported surrogate mirror rootvg 612 in the new LPAR 610 is updated to the new level of the updated operating system, i.e. the updates to the operating system 620 performed to the updated clone rootvg 608 are applied to the operating system instance 615 in the surrogate mirror rootvg 612 that was imported into the new LPAR 610. This update will function like a standard operating system update applied to a running system however no reboot is required because the new LPAR 610 is already running the operating system with the update applied due to the use of the updated clone rootvg 608. Thus, the operating system 615 in the surrogate mirror rootvg 612 is updated to the same update level as the updated clone rootvg 608 used to boot the new LPAR 610 and the application instances 614 can make use of the additional or different functionality and services provided by the updated operating system 622. It should be noted that during this update, the application instances 614 are still running and do not need to be restarted.

This process may be performed while asynchronous transfer of application memory is being performed between application memory 616 and application memory 618. Again, after the asynchronous application memory transfer is complete, the original rootvg 602 in the old LPAR 604 can be used as a fall back rootvg if needed, e.g., in the case of an error due to the operating system update being experienced. Alternatively, the original rootvg 602 on the old LPAR 604 can be removed if no longer needed after the asynchronous application memory transfer is completed.

Figure 6F:
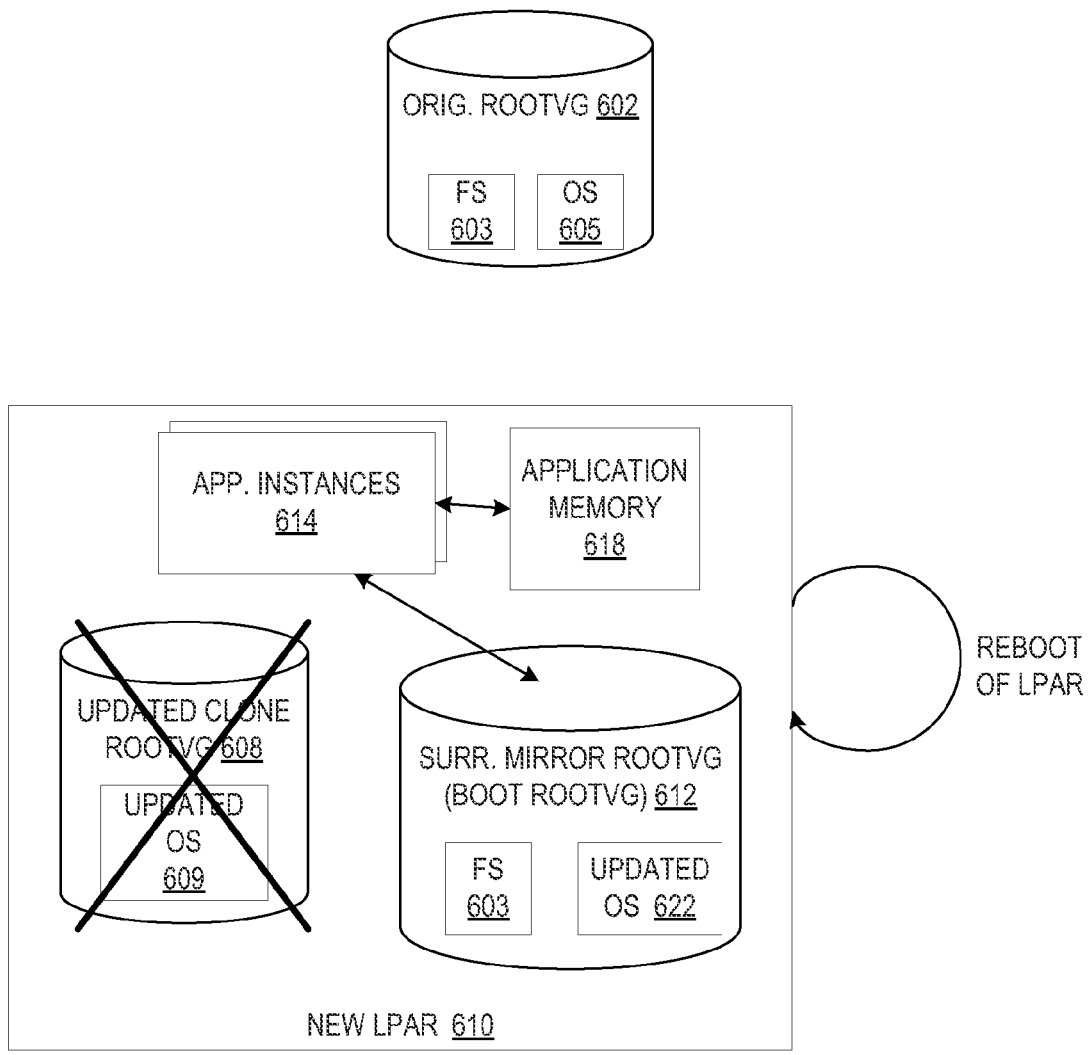

As shown in FIG. 6F, it should be appreciated that if the new LPAR 610 ever needs to be rebooted, such as if there are configuration changes that require a reboot for the configuration changes to take effect or there is a software or hardware failure that requires a reboot, the surrogate mirror rootvg 612 will be used as the boot rootvg for the new LPAR 610. That is, during the live update operation, a "bootlist" command may be executed on the new LPAR 610 after the surrogate mirror rootvg 612 is imported and mounted that will inform the new LPAR 610 that the surrogate mirror rootvg 612 is the boot rootvg for the new LPAR 610. The temporary updated clone rootvg 608, which was previously used to boot the new LPAR 610 as part of the live operating system update operation, will not be used for such a reboot operation and may in fact be removed after reboot of the new LPAR 610.

Hence, the application instances 614 are now executing within a LPAR 610 that has been booted using an updated operating system that was updated during a live operating system update operation with minimal blackout period for application instances and a consistent view of the file system maintained during the live operating system update operation. It can be seen from the live operating system update operation described above and depicted in FIGS. 6A-6F that the blackout time period for the application instances 614 only occurs while the application instances 614 are frozen, allowing splitting of the mirrored rootvgs 602 and 612 in the original LPAR 604 and importation of the surrogate mirror rootvg 612 into the new LPAR 610, and the applications are then restarted on the new LPAR 610.

Thus, the illustrative embodiments not only provide mechanisms for performing a live update of an operating system which involves the receipt of an update to an operating system and cloning an original root volume group associated with an operating system instance executing in a first logical partition of the data processing system to generate a cloned root volume group for booting a second logical partition of the data processing system. The original root volume group, associated with an operating system instance executing in a first logical partition of the data processing system, is mirrored to generate a mirrored root volume group in the first logical partition. Updates to the original root volume group are mirrored to the mirrored root volume group. The mirroring operation may be performed in parallel with the cloning operation.

The operating system update is applied to the cloned root volume group to generate an updated and cloned root volume group. The second logical partition of the data processing system is booted using the updated and cloned root volume group and the mirrored root volume group is imported into the second logical partition. Application instances are migrated to the second logical partition by restarting the application instances in the second logical partition using the mirrored root volume group. Prior to importing the mirrored root volume group into the second logical partition, the application instances running in the first logical partition may be frozen until the application instances are restarted in the second logical partition. Again, freezing application instances comprises preventing modifications to a root file system of the mirrored root volume group by the application instances while the application instances are frozen. Prior to importing the mirrored root volume group into the second logical partition, the mirrored root volume group may be split from the original root volume group such that modifications to the original root volume group are not mirrored to the mirrored root volume group.

The update may be applied to the mirrored root volume group imported into the second logical partition after importing the mirrored root volume group into the second logical partition. The update to the mirrored root volume group may be performed prior to completion of the migration of the application instances to the second logical partition or after completion of the migration of the application instances to the second logical partition.

As previously mentioned above, a first data structure specifying a set of base services that cannot be migrated from the first logical partition to the second logical partition may be maintained and a set of migratable services that can be migrated from the first logical partition to the second logical partition may be identified. Booting the second logical partition may involve migrating the identified set of migratable services from the first logical partition to the second logical partition, where the set of migratable services is customized to boot the second logical partition using a minimal set of services necessary to establish a network connection with the first logical partition and receive migrated application instances. The first logical partition may be maintained operational with the set of base services specified in the first data structure executing in the first logical partition until migration of the application instances and application data to the second logical partition is complete.

The application data in memory associated with the first logical partition may be asynchronously migrated to memory associated with the second logical partition in accordance with demand paging by the migrated application instances. Moreover, the original root volume group in the first logical partition may be maintained as a fall back root volume group after asynchronous transferring of the application data is complete.

Thus, the illustrative embodiments provide mechanisms for performing live updates/patches of operating systems executing in virtualized environments, e.g., within logical partitions of a computing device. The illustrative embodiments provide such live update/patch functionality without having to shut down and restart application instances or workloads and/or the computing device. In addition, the illustrative embodiments avoid the performance penalty associated with having to track processes, threads, and associated resources prior to the update/patch operation being performed and instead allows such information to be identified after the live update process is initiated. The illustrative embodiments handle the cloning of file systems and updating of the operating system image automatically as part of the live update process and do not require a second active LPAR to be in place prior to the live update process being initiated. Furthermore, the illustrative embodiments can provide automatic provisioning of processor and memory resources to the new LPAR and subsequent de-provisioning of the resources owned by the original LPAR. Applications continue to run on what appears to be the same LPAR as prior to the update/patch operation. For management of the workloads, there is no added complication of moving from one LPAR to another within a WPAR. Furthermore, the illustrative embodiments do not have the WPAR's limitations on what applications can be included in the update/patch. The update/patch is accomplished without the use of a WPAR.

In addition to these benefits, the illustrative embodiments further provide for a consistent view of the file system by the application instances as they are migrated from an original LPAR in which the operating system update has not been applied, to a new LPAR in which the operating system update has been applied and used to boot the new LPAR. Furthermore, application blackout periods associated with the migration of the application instances to the new LPAR are minimized by limiting these blackout periods to only the time required to import a mirrored rootvg into the new LPAR and restart the application instances in the new LPAR using the imported mirrored rootvg.

Figure 7:
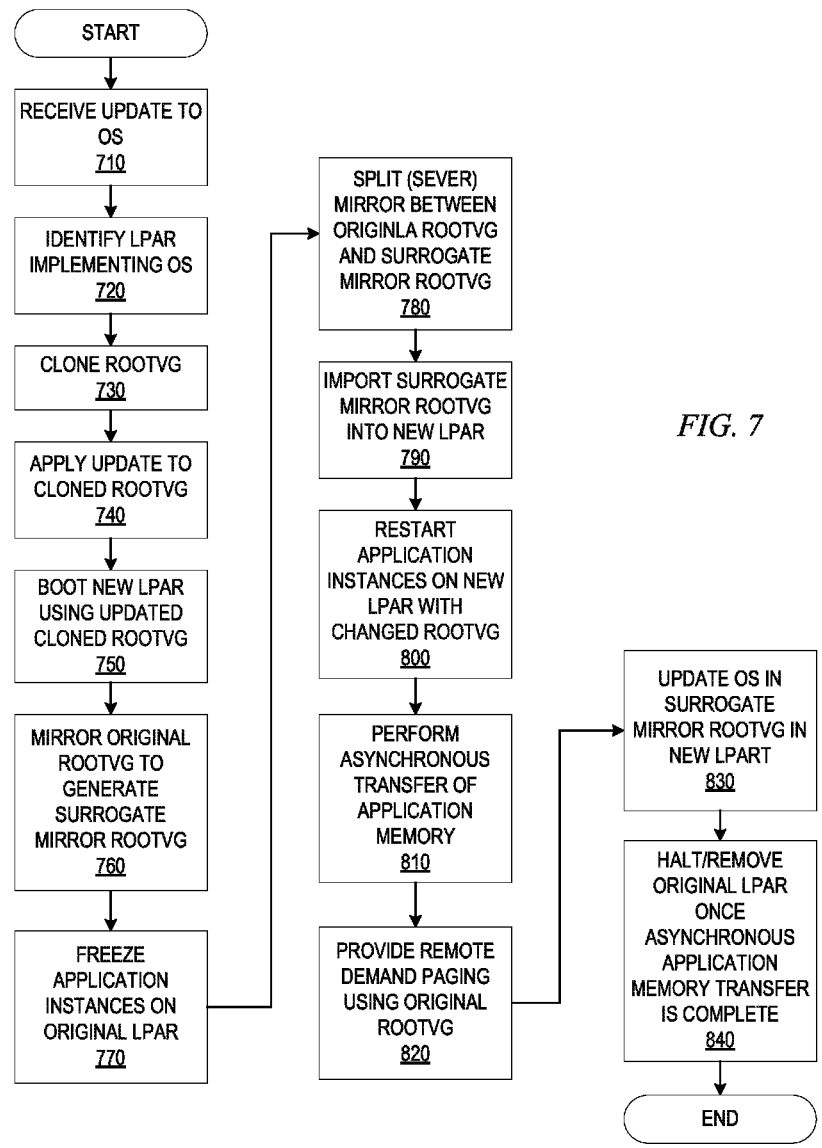
FIG. 7 is a flowchart outlining an example operation for performing a live operating system update with consistent root file system views and minimum application blackout time in accordance with one illustrative embodiment.

FIG. 7 is a flowchart outlining an example operation for performing a live operating system update with consistent root file system views and minimum application blackout time in accordance with one illustrative embodiment. The operation outlined in FIG. 7 may again be implemented using a live update engine, such as live update engine 315, that implements the logic described above with regard to FIGS. 6A-6F, for example. It should be appreciated that many of the steps shown in FIG. 7 as being in a particular sequence due to limitations on depicting these steps in a flowchart manner, may in fact be performed in parallel to one another and may in fact be performed in a different order than that shown in FIG. 7 without departing from the spirit and scope of the present invention.

As shown in FIG. 7, the operation starts by receiving an update to the operating system to be applied (step 710). A logical partition implementing the operating system to be updated is identified (step 720) and the original root volume group of the operating system executing in this original logical partition is cloned (step 730). The update is applied to the cloned root volume group to generate an updated cloned volume group (step 740). The updated cloned volume group is used to boot a new logical partition (step 750).

The original root volume group is also mirrored within the original logical partition to create a surrogate mirror root volume group (root vg) (step 760). Application instances running in the original logical partition (LPAR) are frozen (step 770) and the mirror relationship between the surrogate mirror rootvg and the original rootvg is severed (step 780). The surrogate mirror rootvg is then imported into the new LPAR (step 790). The application instances are restarted on the new LPAR with their rootvg changed to that of the surrogate mirror rootvg (step 800). Asynchronous application memory operations are performed to migrate application data from application memory in the original LPAR to the application memory in the new LPAR (step 810).

The original rootvg and original LPAR continue to operate to provide remote paging for demand paging of application memory until all of the application data is transferred from the original LPAR to the new LPAR (step 820). The surrogate mirror rootvg is updated with the operating system update (step 830). Once application memory transfer has been completed, the original LPAR is halted and removed, with the possibility of keeping the original rootvg as a fallback on reboot if needed (step 840). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program stored therein, wherein the computer readable program, when executed on a computing device, causes the computing device to:
    receive an update to an operating system;
    clone an original root volume group associated with an operating system instance executing in a first logical partition of the computing device to generate a cloned root volume group for booting a second logical partition of the computing device;
    mirror the original root volume group associated with the operating system instance executing in the first logical partition of the computing device to generate a mirrored root volume group in the first logical partition, wherein modifications to the original root volume group are mirrored to the mirrored root volume group;
    apply the update to the cloned root volume group to generate an updated and cloned root volume group;
    boot the second logical partition of the data processing system using the updated and cloned root volume group without shutting down and restarting the computing device;
    import the mirrored root volume group into the booted second logical partition; and
    migrate application instances to the second logical partition by restarting the application instances in the booted second logical partition using the mirrored root volume group.

2. The computer program product of claim 1, wherein the computer readable program further causes the computing device to:
    freeze, prior to importing the mirrored root volume group into the booted second logical partition, application instances running in the first logical partition until the application instances are restarted in the second logical partition, wherein freezing application instances comprises preventing modifications to a root file system of the mirrored root volume group by the application instances while the application instances are frozen.

3. The computer program product of claim 1, wherein the computer readable program further causes the computing device to:
    split, prior to importing the mirrored root volume group into the booted second logical partition, the mirrored root volume group from the original root volume group such that modifications to the original root volume group are not mirrored to the mirrored root volume group.

4. The computer program product of claim 1, wherein the computer readable program further causes the computing device to:
    apply the update to the mirrored root volume group imported into the booted Second logical partition after importing the mirrored root volume group into the booted second logical partition.

5. The computer program product of claim 4, wherein the computer readable program further causes the computing device to apply the update to the mirrored root volume group prior to completion of the migration of the application instances to the booted second logical partition.

6. The computer program product of claim 4, wherein the computer readable program further causes the computing device to apply the update to the mirrored root volume group after completion of the migration of the application instances to the booted second logical partition.

7. The computer program product of claim 1, wherein the mirroring operation is performed in parallel with the cloning operation.

8. The computer program product of claim 1, wherein the computer readable program further causes the computing device to:

store a first data structure specifying a set of base services that cannot be migrated from the first logical partition to the second logical partition; and identify a set of migratable services that can be migrated from the first logical partition to the second logical partition, wherein booting the second logical partition comprises migrating the identified set of migratable services from the first logical partition to the second logical partition, wherein the set of migratable services is customized to boot the second logical partition using a minimal set of services necessary to establish a network connection with the first logical partition and receive migrated application instances.

9. The computer program product of claim 8, wherein the computer readable program further causes the computing device to:

maintain the first logical partition operational with the set of base services specified in the first data structure executing in the first logical partition until migration of the application instances and application data to the booted second logical partition is complete.

10. A data processing system comprising:
a processor; and
a memory coupled to the processor, wherein the memory comprises instructions which, when executed by the processor, cause the processor to:
receive an update to an operating system;
clone an original root volume group associated with an operating system instance executing in a first logical partition of the data processing system to generate a cloned root volume group for booting a second logical partition of the data processing system;
mirror the original root volume group associated with an operating system instance executing in a first logical partition of the data processing system to generate a mirrored root volume group in the first logical partition, wherein modifications to the original root volume group are mirrored to the mirrored root volume group;
apply the update to the cloned root volume group to generate an updated and cloned root volume group;
boot the second logical partition of the data processing system using the updated and cloned root volume group without shutting down and restarting the data processing system;
import the mirrored root volume group into the booted second logical partition; and
migrate application instances to the booted second logical partition by restarting the application instances in the booted second logical partition using the mirrored root volume group.

* * * * *